May 10, 1932. L. J. BROCHE 1,858,137
APPARATUS FOR USE IN THE MANUFACTURE OF GLASSWARE
Filed Sept. 20, 1926 5 Sheets-Sheet 3

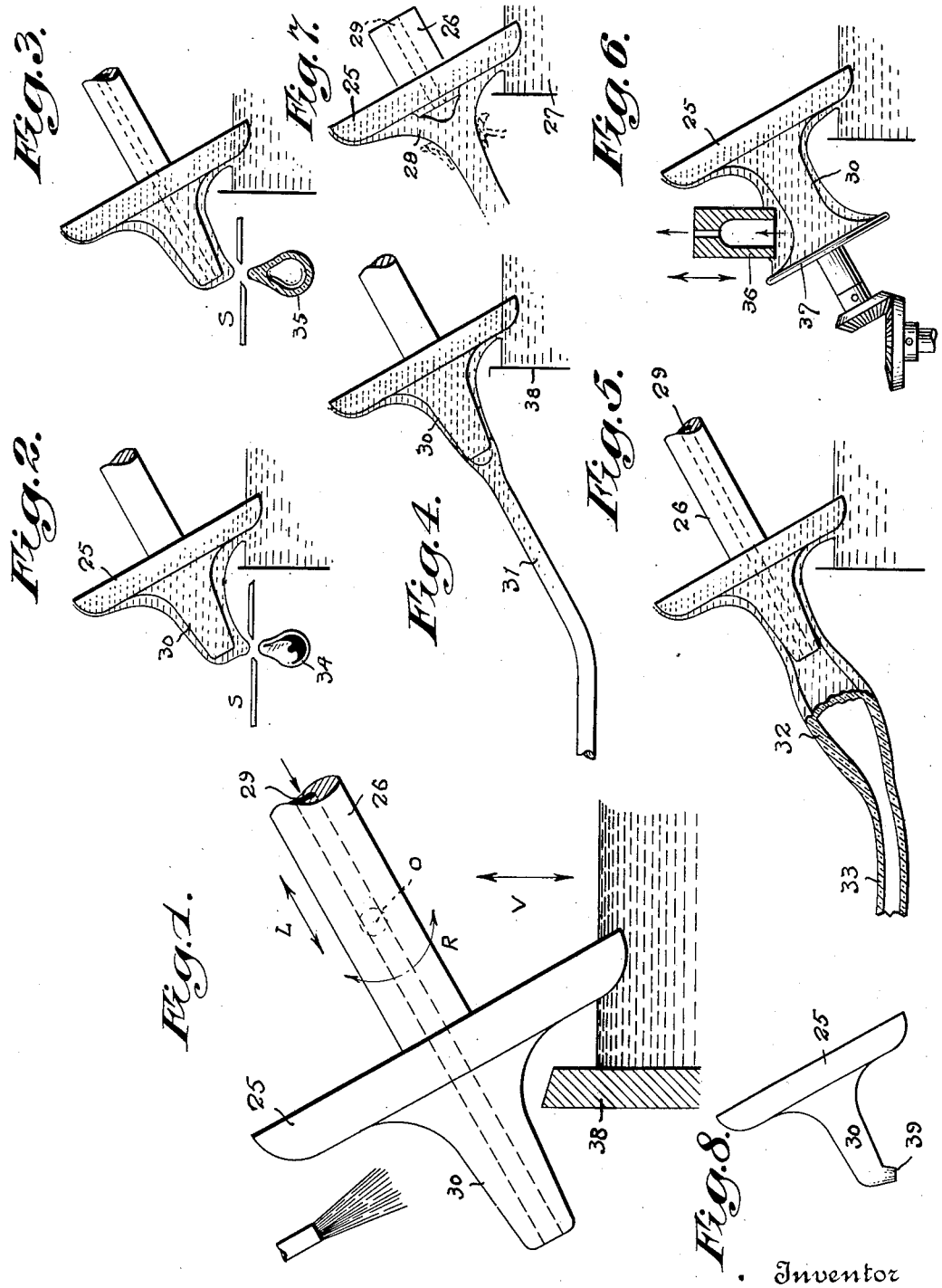

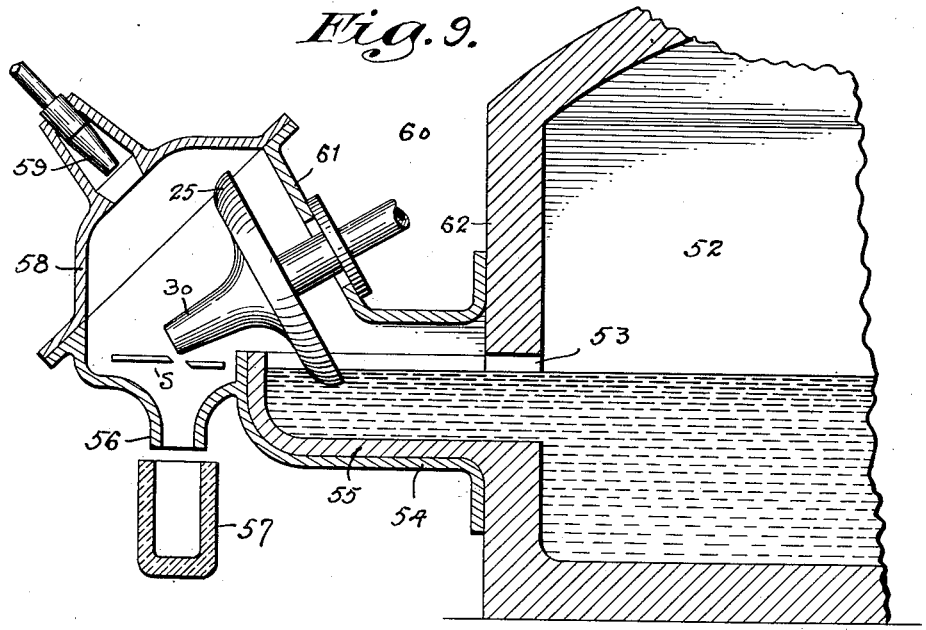
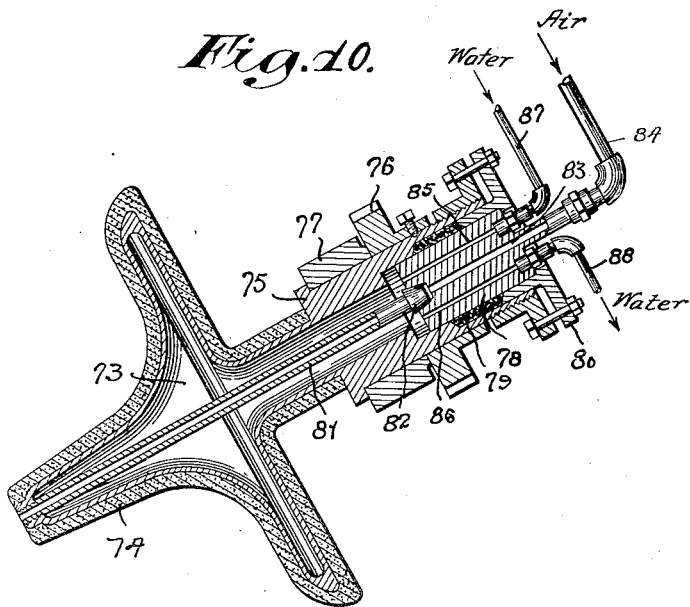

Inventor
LEON J. BROCHE
By his Attorneys

Patented May 10, 1932

1,858,137

UNITED STATES PATENT OFFICE

LEON JEAN BROCHE, OF ST. CLOUD, FRANCE, ASSIGNOR TO TROPENAS COMPANY, OF NEW YORK, N. Y., A CORPORATION OF DELAWARE

APPARATUS FOR USE IN THE MANUFACTURE OF GLASSWARE

Application filed September 20, 1926. Serial No. 136,632.

My invention relates to apparatus for use in the manufacture of glassware, and is concerned not only with method of operation, but also with related apparatus. More particularly, my invention contemplates gathering molten glass from a suitable container and feeding it either intermittently in the form of solid, or bubble gobs, or continuously as a solid rod or as a hollow tube or cylinder.

The apparatus by which my invention may be practiced is subject to many variations, and only certain illustrative embodiments are shown in the accompanying more or less diagrammatic drawings, in which Fig. 1 is a partial side elevation of a feeder arranged in operative relation to a bath of molten glass;

Figs. 2 to 8, inclusive, are similar views on smaller scale, illustrative of different constructions of feeder and different types of intermittent and continuous delivery from the feeder;

Fig. 9 is a vertical section through a modified fore-hearth arrangement;

Fig. 10 is a longitudinal section through a water-cooled feeder;

Figure 11:
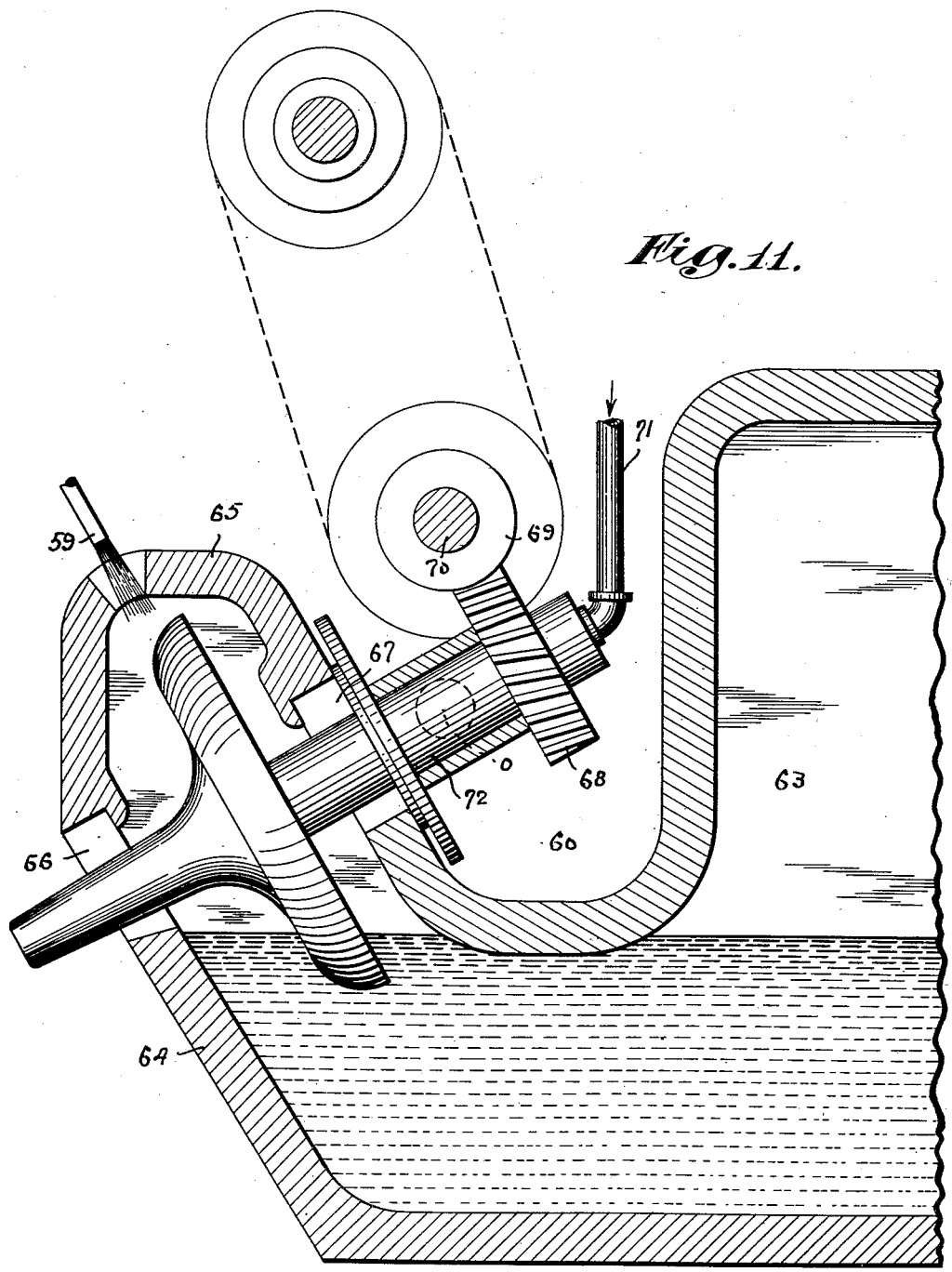
Fig. 11 is a section through a glass melting pot, associated with a feeder.

In the art of glass manufacture it is customary to provide the furnace in which the glass is melted, with a fore-hearth into which the molten glass enters from the body of the furnace, and to effect the feed to molds or other forming appliances, from the fore-hearth. Various feed devices have been suggested, but the only ones that have gone into extensive practical use are (1) the suction blank feeder, (2) the plunger or needle type feeder, and (3) the flow feeder. These types are well known in the art, and need no detail description. It is pointed out, however, with respect to the plunger or needle type feeder, that it operates in conjunction with a discharge port in the bottom of the fore-hearth. Consequently, when anything goes wrong with the plunger, the port remains open and there is a continuous flow of glass from the fore-hearth, which results in serious waste. The same is true of the flow feeder, when there is any interruption in the action of the closing valve. With respect to the suction blank feeder, the level of the glass in the revolving fore-hearth into which the molten glass spills from the furnace, must be kept accurately to a predetermined level for proper cooperation with the suction blank. Moreover, if the suction apparatus becomes disordered the feed from the furnace to the revolving fore-hearth continues, with resultant waste by spill-over from the latter. For all these types of feed, complicated mechanism is required, and great precision and exactitude in the timing of operations.

My invention comprehends a feeder which involves a marked departure from these prior practices, and is attended with great advantages thereover. There can be no waste on halt of the present feeder. Its characteristics are such that it is adaptable to various types of feed, and it can even be used in conjunction with some of the older types to overcome their deficiences. It is simpler in construction and in operation then any of the feeders in operation today.

Essentially my feeder comprises a rotary gatherer which dips at its lower periphery into a body of molten glass, and lifting glass from the latter above the surface of the bath, causes it to accumulate or gather toward the axis of the rotor for feed to associated apparatus. The particular shape of the feeder may be modified in many ways. It may, for example, comprise pockets, guide channels or ribs, a roughened surface, or it may be merely a relatively smooth surface which is dependent primarily upon surface adhesion to lift the glass above the bath. I have illustrated only the latter form in the accompanying drawings for the sake of simplicity, and further for the reason that I have found that this simple form operates satisfactorily in practice.

The form in which the gathered glass is delivered, is variable, and may be influenced by the shape and manner of operation of the feeder. For example, if the glass is to be delivered continuously, as required for rod, tube or cylinder manufacture, the gatherer may be merely a disc-like body, toward the center of the delivery face of which the lifted glass moves in a more or less spiral course as the disc rotates. The glass, thus concentrated or gathered in the central area of the disc, may be drawn continuously therefrom to form a rod, tube or cylinder. For tube formation, a central blast passage is provided in the disc-like gatherer, through which an air blast is continuously forced into the gathered and drawn glass.

An initial tubular shape may be positively imparted to the glass before it leaves the feeder, if a central boss be formed on the delivery face of the disc. The molten glass which is lifted from the bath on the peripheral area of the feeder, flows toward the axial boss, gathers around it, and is drawn from its end in the form of an annulus. The annulus thus continuously drawn from the boss may be permitted to collapse into a solid rod, or a continuous blast may be supplied through the boss to cause the delivered glass to form a tube or cylinder.

Instead of a continuous feed, as for tube, rod or cylinder manufacture, an intermittent feed may be obtained. Thus, for a gob feed, the gather may be permitted to depend from the end of the boss until it attains the desired size and shape, whereupon it may be severed by shears. If a bubble gob is desired, it is only necessary to blow air through the feeder as the gather forms at the end of the boss, to obtain a hollow or bubble gob, which may be severed by shears in like manner.

Again the boss may be provided with a terminal flange which serves as a dam, so that the glass lifted on the peripheral area of the disc and flowing onto the axial boss, is halted by the dam and forms a gather of sufficient depth to supply a suction blank brought into cooperative relation with the feeder. If a sufficient quantity of glass be taken from the bath by the peripheral area of the disc, it gathers upon the boss in sufficient depth to supply the suction blank, without the necessity for the dam flange mentioned.

These are only illustrative examples of feeder form and operation embodying my invention. Variations in both will readily occur to those skilled in this art. Aside from variation of form, it is also obvious that the speed of rotation and the direction of rotation of the feeder, the depth of its entry into the bath, the angle of inclination of the feeder axis with respect to the surface of the bath, the volume of air delivery (when used) with respect to the volume of glass delivery, the temperature of the bath and of the atmosphere surrounding the feeder, are all variables which may be altered to obtain the results desired.

Referring to the drawings, and particularly to Figs. 1 to 8, I have shown in Fig. 7 what is probably the simplest form of feeder embodying my invention. It comprises a rotor 25 in the form of a disc carried by driving spindle 26. Its location with respect to the molten glass bath 27 is such that the peripheral area of the disc is submerged to a certain arcuate extent at the bottom of its annular path, so that the glass is carried upward thereon by surface adhesion as the feeder rotates. The delivery face of the feeder is at such inclination to the vertical that the molten glass, flowing by gravity downward thereon, and deflected into a spiral course by the rotation of the disc, thickens into a gather 28 toward the center or axis of the disc. The gather, thus continuously formed, may be drawn from the feeder by any suitable means, to form a continuous rod, tube or cylinder. For the tube and cylinder products, air may be blown through the axial passage 29 in the feeder; but if preferred the air may be supplied through the drawing head, as is now common in vertical cylinder drawing. The diameter of the disc may be as large, or as small, as desired. If cylinders of a size commensurate with those now drawn for sheet glass manufacture are to be produced, the disc may be several feet in diameter. The twisting of the drawn-out gather by the rotation of the feeder may be minimized, if found desirable, by locating at appropriate distances from the delivery face of the feeder, a stationary annular guide through, and in contact with, which the gather is drawn off from the feeder.

In Figs. 1 to 6 inclusive, and in Fig. 8, I have shown the delivery face of the feeder provided with an axial projection or boss 30, upon which the gather forms in an annular mass. This projection is of relatively small diameter as compared with the disc and extends from the central area of the disc, thus leaving a considerable area of the disc portion beyond it on which the thin film of glass may be formed as it is picked up. The projection is of gradually decreasing diameter towards its outer end by reason of which the layer of glass upon it becomes thicker, thus enhancing the gathering effect. Various types of delivery may be effected from this form of feeder. Thus, on drawing the gather from this boss the annulus may be permitted to collapse into a solid rod 31 (Fig. 4), or air may be blown through the boss to form a bubble 32 (Fig. 5) which, as drawn, forms a tube 33. Again the gather may be permitted to depend from the end of the boss and, when severed by shears S, forms a solid gob 34 (Fig. 2), or if blown, a bubble gob 35 (Fig. 3). If desired the gather on the boss may be picked up by a cooperating suction blank 36, (Fig. 6) and for this type the boss may be provided with a dam flange 37, when the depth of the gather on the boss is otherwise insufficient.

Where the feeder is provided with an axial boss it is obvious that the glass not only moves in a generally radial direction inward from the peripheral pick-up area of the feeder (as in Fig. 7), but also moves longitudinally in an axial direction to the delivery area of the boss (as in Figs. 1 to 6 and 8)—that is to say, laterally with respect to the point at which the glass is taken up from the bath. This characteristic of the feeder, which thus not only lifts the glass from the bath, but causes its lateral displacement for delivery, makes it possible to deliver from the feeder outside the confines of the bath. Thus in Figs. 1 to 6 it will be noted that the point at which the glass leaves the feeder is beyond the boundary wall 38 of the furnace or fore-hearth. Gob feed to an extraneous mold beyond the boundaries of the bath, is thus readily accomplished.

In Fig. 8 I have shown at the free end of the feeder boss an offset nose 39. While the rotation of a plain boss such as shown in Figs. 1 to 6, immediately following the operation of the shears, serves to retract the portion of the gather above the shears into the mass of glass upon the feeder, and thus to remelt the "scar" which is formed by the shears, I find that the provision of an offset nose such as shown in Fig. 8, accentuates this retracting action, particularly if the severing of the gob is accurately timed to occur when the nose of the boss is located at the lowermost point of its travel.

The shaping of the solid or the bubble gob may be controlled by varying the speed of rotation, or the direction of rotation of the feeder, during the period of the gather formation, and in the case of the bubble gob by varying also the volume of air supplied during the progress of the gather.

In Fig. 1, I have indicated by arrows R that the feeder is reversely rotatable; by the arrows V that it is vertically adjustable, and by the arrows L that it is axially adjustable. The feeder is preferably mounted on a transverse axis O so that it may be swung up out of the bath, when not in service, thus protecting it against injurious overheating. It will be understood that these movements are applicable to all forms of the feeder.

The fore-hearth construction with respect to the feeder may be variously organized. As shown in Fig. 9 the side wall of furnace 52 has a port 53 through which the molten glass flows to the fore-hearth. The latter comprises a body casting 54 secured to the furnace side wall and lined with refractory material 55 at least to the level of the molten glass therein. It will be noted that the glass level in the fore-hearth is below the level of the top of port 53, and that consequently heat from the furnace chamber is free to enter the fore-hearth chamber. Beyond the port area proper of the fore-hearth, the lower wall of the casting is shaped to afford a guideway or funnel 56, which directs the gob into a subjacent mold 57. A fore-hearth cap 58 prevents upward escape of heat from the fore-hearth and may be shaped to carry a burner 59 and to direct its flame into the fore-hearth chamber in the neighborhood of the feeder. The latter, in the form shown, is of the boss-disc type, supported in the upper wall of the main fore-hearth casting 54, with its peripheral flange 25 dipping into the molten glass on the hearth and its boss 30 projecting beyond the end wall of the fore-hearth, and so located that the end of the boss is in substantial registry with the guideway 56 leading to the mold 57. The driving mechanism (not shown) and the air pipe (if used) may be accommodated in the gap 60 between the inclined upper wall 61 of the fore-hearth casting and the wall 62 of the furnace.

In Fig. 11 a glass melting pot 63 is illustrated, the pot being provided with a lateral bay or spout 64 closed by a removable cap 65. The gaps 66 and 67 in the end walls of the spout permit the insertion and removal of the feeder which is thus shiftable from pot to pot. The gaps 66 and 67 are of sufficient depth to permit adjustment of the feeder with respect to the glass level in the pot, which gradually lowers as the feeder operates. The flange 25 of the feeder may be made of sufficient diameter to extend approximately to the bottom of the pot, the cap 65 being appropriately shaped to accommodate the flange diameter. The pot may thus be practically drained by shifting the feeder gradually toward the pot bottom. The driving mechanism for the feeder is illustrated as a spiral gear 68 meshing with a pinion 69 on the belt shaft 70. A pipe 71 connects with the end of the hollow spindle 72 for supplying air to the interior of the glass delivered from the feeder boss 30, where it is desired to obtain a tubular or cylindrical product, or a bubble gob.

In Fig. 10 I have indicated a water-cooled feeder comprising a more or less conical metal casting 73 embedded in a refractory 74. The casting may be integral with or otherwise secured to a driving hub 75, which carries the drive gear 76 above the bearing 77. A perforated bushing 78 is fitted within the hub 75, the joint being sealed by packing 79 and stuffing box 80. A blast conduit 81 rotating with the feeder makes cone joint at 82 with the bushing 78 in register with the passageway 83 therein, to which the blast pipe 84 leads. The bushing is also pierced at 85 and 86, the former connecting with the water supply pipe 87, and the latter with discharge pipe 88.

Figure 12:
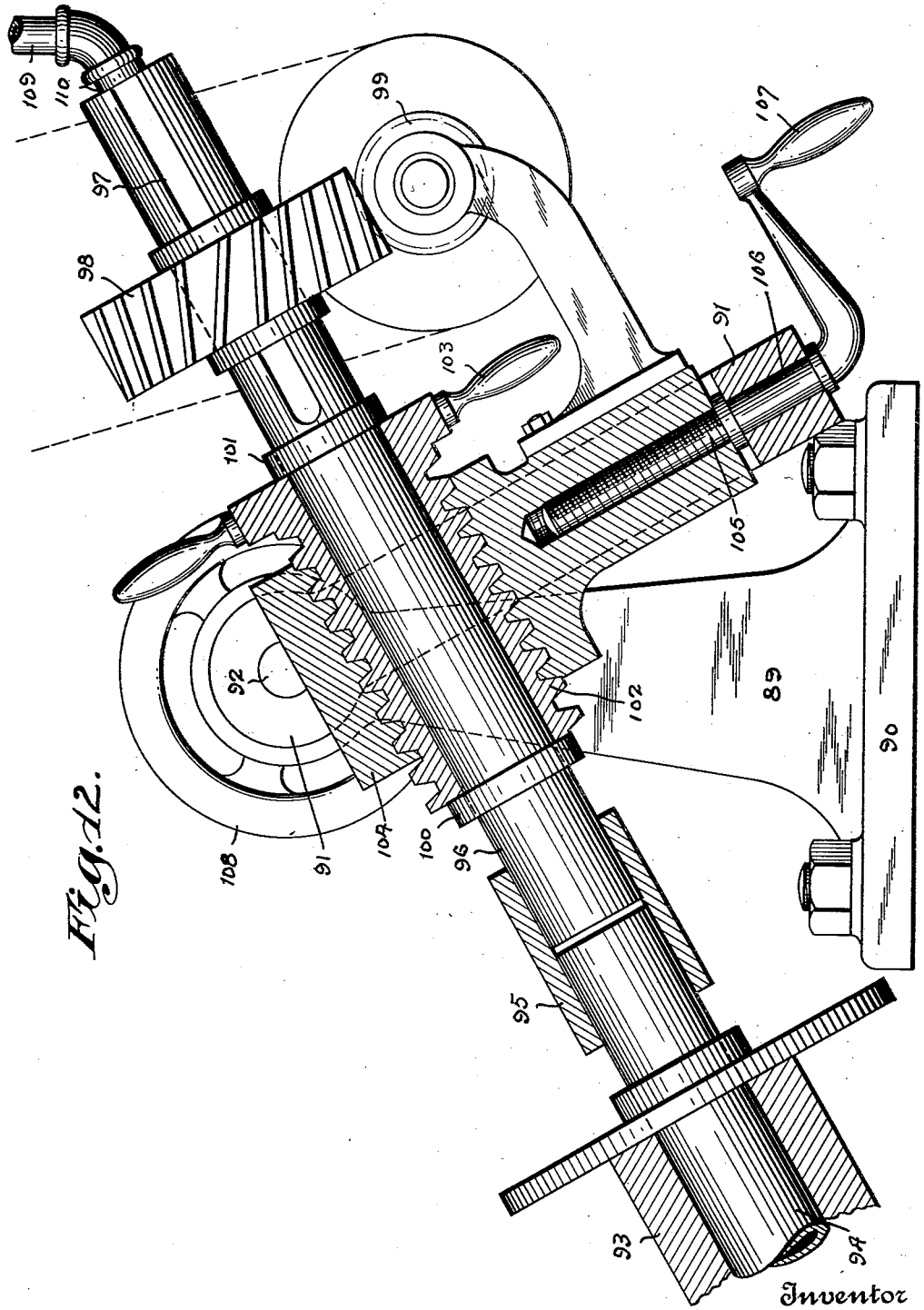
Fig. 12 is a side elevation, partially in section, of an adjusting and driving mechanism for the feeder.

An adjustable mounting and the drive of the feeder is illustrated to a larger scale in Fig. 12. A pair of standards 89 secured by their base plates 90 on any suitable base, carry the feeder in a yoke member 91, pivoted at 92 to the heads of the standards, so that the feeder unit as a whole may be swung into and out of the bath. The hub 93 of the feeder is carried by a hollow spindle 94, connected by a sleeve 95 to a second hollow shaft 96. The latter is provided with a keyway 97 in which the spiral gear 98 is longitudinally slidable so that it may maintain its meshing engagement with its driving pinion 99, regardless of the longitudinal adjustment of the shaft 96 with respect thereto. Between collars 100 and 101 on the shaft 96 is engaged a screw sleeve 102 provided with a handwheel 103 so that it may be turned on the shaft. The screw 102 works in a bearing block 104 slidably supported in the arms of the yoke member 91. It is obvious that by rotating the hand-wheel 102 the shaft 96 is forced to travel longitudinally with respect to the block 104.

The block 104 is in turn slidably adjustable in the arms of the yoke 91 by reason of its engagement with the adjusting screw 105, journalled at 106 in the cross bar of the yoke, and provided with a manipulating handle 107. By rotating the screw 105 the bearing block, and consequently the entire feeder, may be adjusted toward and from the bath. Any suitable means may be provided for securing the yoke in desired position—for example a clutch device (not shown) operated by means of a hand-wheel 108. The blast pipe 109 may be of flexible material, and has a stuffing box connection 110 with the end of the hollow shaft 96. The mechanism described affords means for the angular, vertical and longitudinal adjustment of the feeder which have been referred to earlier in the present specification.

I have indicated in Fig. 6, more or less diagrammatically, a construction of feeder appropriate for use with the suction blank 36. This layout is shown somewhat more in detail in Figs. 13 and 14, in which the flange 25 of the feeder enters through an angular mouth 111 into the chamber 112 of a forehearth 113. The glass lifted from the forehearth by the flange 25 gathers on the boss 30 of the feeder, which is provided with an annular dam 37. The suction blank 36 follows an arcuate course which registers in part with the feeder boss; any suitable mechanism may be provided for moving the blank downward into the gather 114 on the boss, and for travelling the blank along the length of the boss during the suction period, followed by lifting the blank as it approaches the outer end of the gather on the feeder. In a feeder of this type it is readily possible to effect the drive of the feeder from its outer end, for example by means of a bevel gear 115 on the end of the feeder shaft, and meshing with an associated driving gear 116. A shaft bearing 117 may be supported by a bracket 118 detachably secured to the forehearth extension 119 or to the floor of the work chamber. The extension 119 serves not only as a drip catcher, but also as a heat reflector to maintain the glass on the feeder in properly fluid condition. A burner 120 may be appropriately located to supply heat to the working area of the feeder.

Figure 13:
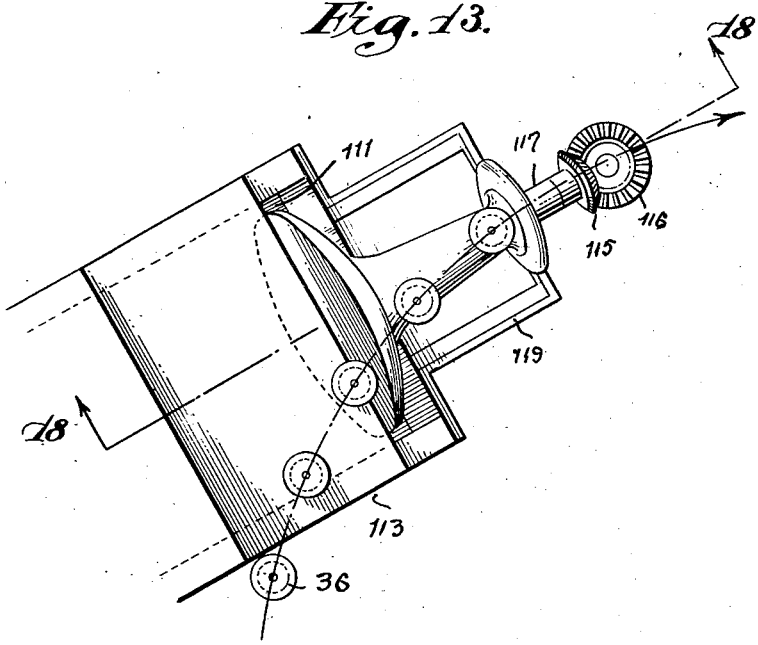
Fig. 13 is a more or less schematic plan of another fore-hearth arrangement particularly adapted to suction blank delivery.
Figure 14:
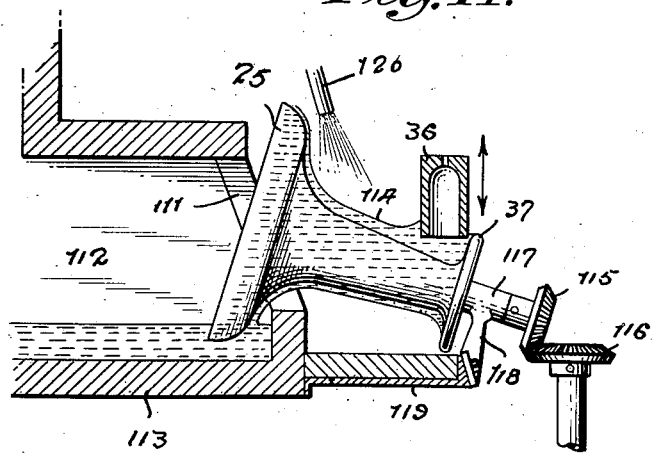
Fig. 14 is a section on the line 18—18, Fig. 17.

While I have shown the feeder in Figs. 13 and 14 in connection with a suction blank layout, it will be obvious that it may be also used as a feeder for solid gobs. In this case the fore-hearth extension 119 would be omitted, and the feeder supported directly from the floor of the work chamber, or otherwise, to afford clearance for the travel of molds beneath the delivery end of the feeder, and also for the operation of the shears. This type of feeder has the advantage of ready portability, thus making it available for use in connection with glass-melting pots for relatively small charges, or melting furnaces of non-continuous type.

While I have indicated in the drawings above described certain forms in which my invention may be embodied, and certain ways in which the invention may be practiced, many other appropriate embodiments of the thoughts which underlie my invention will occur to those skilled in the art. The particular embodiments illustrated are therefore to be regarded as merely illustrative, and in no manner as limiting my invention thereto. With this understanding I claim as my invention—

1. In apparatus for the manufacture of glass products, a container of molten glass, and a feeder cooperating therewith, said feeder comprising a rotor arranged to dip its peripheral area into the bath of molten glass in the container, and to cause flow of lifted glass from said peripheral area, along one face of the rotor toward its axis to form a gather for delivery together with means for severing said gather intermittently from the rotor.

2. In apparatus for the manufacture of glass products, a container for molten glass, and a feeder cooperating therewith, said feeder comprising a rotor having a peripheral area arranged to dip into the bath of molten glass in the container, and an axial projection from one face of the rotor on which glass lifted by the peripheral area of the feeder is automatically gathered incident to the rotation of the feeder together with means for intermittently severing gathers from said projection.

3. In apparatus for the manufacture of glass products, a container for molten glass, and a feeder cooperating therewith, said feeder comprising a rotor arranged on an axis inclined to the plane of the face of the bath of molten glass in the container, and having a peripheral area adapted to dip into said bath and a delivery area toward its axis on which the lifted glass is caused to gather incident to the rotation of the feeder and means intermittently operative to separate the gather from said delivery area.

4. In apparatus for the manufacture of glass products, a container for molten glass, and a feeder cooperating therewith, said feeder comprising a rotor arranged to dip its peripheral area into the bath of molten glass in the container, and to cause flow of lifted glass from said peripheral area, along one face of the rotor toward its axis to gather for delivery, together with means for delivering air into said gather and means for intermittently parting air-blown gathers from said feeder.

5. In apparatus for delivering molten glass from a bath, a rotor, with its axis inclined to the surface of the bath, having a substantially radial lower face arranged to dip at its periphery into the bath to pick up glass and form an annular film thereof, and an axial projection of relatively small diameter extending from the central area of said face, whereby to receive glass from said film and to deliver it while forming into a gather, together with means for intermittently severing the gathered glass from said projection.

6. In apparatus for the manufacture of glass products, a container of molten glass and a feeder cooperating therewith, said feeder comprising a rotor adapted to dip its peripheral area into the bath of molten glass in the container and having an axial projection on which the molten glass may accumulate and a flange on said projection acting as a dam for said molten glass.

7. In apparatus for the manufacture of glass products a container of molten glass and a feeder cooperating therewith, said feeder comprising a rotor arranged to dip its peripheral area into the bath of molten glass in the container, and having an axial projection on which the molten glass may accumulate, in combination with means for sucking the glass vertically upward from said projection.

8. In apparatus for the manufacture of glass products a container of molten glass and a feeder cooperating therewith, said feeder comprising a rotor arranged to dip its peripheral area into the bath of molten glass in the container, and having an axial projection on which the molten glass may accumulate and a flange on said projection acting as a dam for said molten glass in combination with means for sucking the glass vertically upward from said projection.

In testimony whereof I have signed my name to this specification.

LEON JEAN BROCHE.